US012619901B2

(12) United States Patent
Dhar et al.

(10) Patent No.: US 12,619,901 B2
(45) Date of Patent: May 5, 2026

(54) INTELLIGENTLY AGGREGATING DATA USING A CONVOLUTIONAL NETWORK QUANTUM PROCESSOR

(71) Applicant: Bank of America Corporation, Charlotte, NC (US)

(72) Inventors: Partha Sarathi Dhar, Chester Springs, PA (US); Ravi Kiran Hukmani, Hyderabad (IN); Pratikkumar Dharnendrakumar Shah, Gujarat (IN); Kamal Joshi, Uttar Pradesh (IN); Venugopal Ramini, Hyderabad (IN); Swarn Deep, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 692 days.

(21) Appl. No.: 17/989,784

(22) Filed: Nov. 18, 2022

(65) Prior Publication Data

US 2024/0169243 A1 May 23, 2024

(51) Int. Cl.
*G06N 10/60* (2022.01)
*G06Q 20/40* (2012.01)

(52) U.S. Cl.
CPC ........... *G06N 10/60* (2022.01); *G06Q 20/405* (2013.01)

(58) Field of Classification Search
CPC ............................ G06N 10/06; G06Q 20/405
See application file for complete search history.

(56) References Cited

U.S. PATENT DOCUMENTS

| | | | | |
|---|---|---|---|---|
| 8,977,576 | B2 * | 3/2015 | Macready | G06N 10/60 |
| | | | | 706/12 |
| 10,318,881 | B2 * | 6/2019 | Rose | G06N 10/60 |
| 11,475,455 | B2 * | 10/2022 | Lin | G06Q 40/125 |
| 11,809,960 | B2 * | 11/2023 | Ramasamy | G06N 20/00 |
| 12,354,139 | B1 * | 7/2025 | Kurani | G06Q 30/0282 |
| 2015/0142713 | A1 * | 5/2015 | Gopinathan | G06Q 40/03 |
| | | | | 706/14 |

(Continued)

FOREIGN PATENT DOCUMENTS

| | | | | |
|---|---|---|---|---|
| AU | 2016243106 B2 | 10/2016 | | |
| EP | 4418185 A1 * | 8/2024 | | G06Q 40/03 |

*Primary Examiner* — Dylan C White
(74) *Attorney, Agent, or Firm* — Banner & Witcoff, Ltd.

(57) ABSTRACT

Aspects of the disclosure relate to intelligently aggregating data using a convolutional network quantum processor. Using an artificial intelligence model, a computing platform may identify dependencies derived from a consumer request and corresponding values. For each configuration of dependency and corresponding value, the computing platform may determine a likelihood of success. The computing platform may alter the configurations and may determine a likelihood of success for each altered configuration. The computing platform may train a convolutional network to analyze the consumer request using the configurations, the altered configurations, and/or corresponding likelihoods of success. The convolutional network may generate a function that describes the dependencies derived from the consumer request. Using a quantum processing model, the computing platform may analyze different states of the function in parallel and may determine whether to approve or deny the consumer request based on the analysis.

20 Claims, 8 Drawing Sheets

(56) References Cited

U.S. PATENT DOCUMENTS

| 2016/0324559 | A1* | 11/2016 | Vogt | B01F 35/754251 |
| 2018/0253657 | A1 | 9/2018 | Zhao et al. | |
| 2018/0308002 | A1* | 10/2018 | Kurian | G06F 11/00 |
| 2018/0357563 | A1* | 12/2018 | Kurian | G06N 20/00 |
| 2020/0065815 | A1* | 2/2020 | Bayer | H04L 63/1425 |
| 2020/0311808 | A1* | 10/2020 | Srivastava | G06Q 40/03 |
| 2020/0334680 | A1* | 10/2020 | Vanga | G06N 20/00 |
| 2020/0349641 | A1* | 11/2020 | Fidanza | G06N 20/00 |
| 2021/0241292 | A1* | 8/2021 | Pandey | G06N 3/0442 |
| 2021/0390439 | A1* | 12/2021 | Ramasamy | G06N 10/60 |
| 2023/0351424 | A1* | 11/2023 | Mistor | G06N 3/044 |
| 2025/0111371 | A1* | 4/2025 | Zhou | G06Q 20/405 |
| 2025/0165864 | A1* | 5/2025 | Ghosh | G06N 20/00 |

* cited by examiner

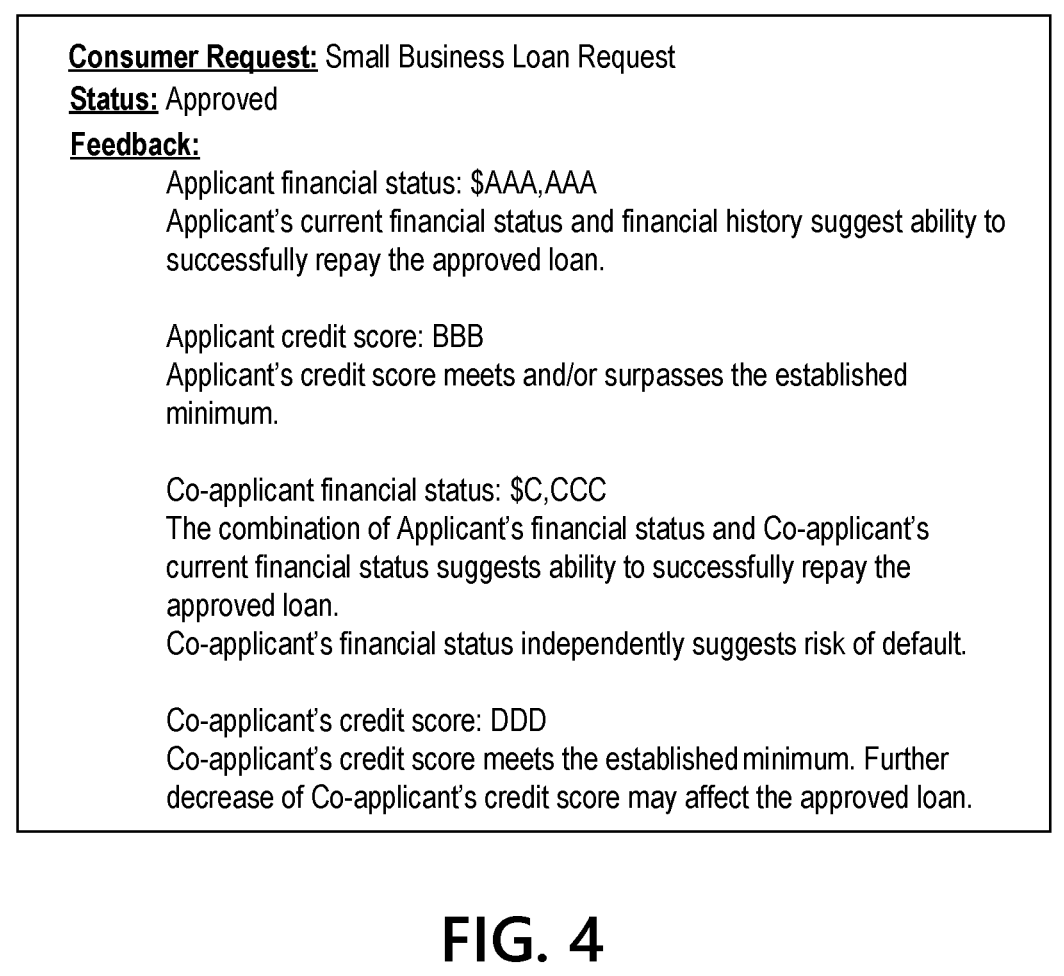

Consumer Request: Small Business Loan Request

Status: Approved

Feedback:

Applicant financial status: $AAA,AAA
Applicant's current financial status and financial history suggest ability to successfully repay the approved loan.

Applicant credit score: BBB
Applicant's credit score meets and/or surpasses the established minimum.

Co-applicant financial status: $C,CCC
The combination of Applicant's financial status and Co-applicant's current financial status suggests ability to successfully repay the approved loan.
Co-applicant's financial status independently suggests risk of default.

Co-applicant's credit score: DDD
Co-applicant's credit score meets the established minimum. Further decrease of Co-applicant's credit score may affect the approved loan.

FIG. 4

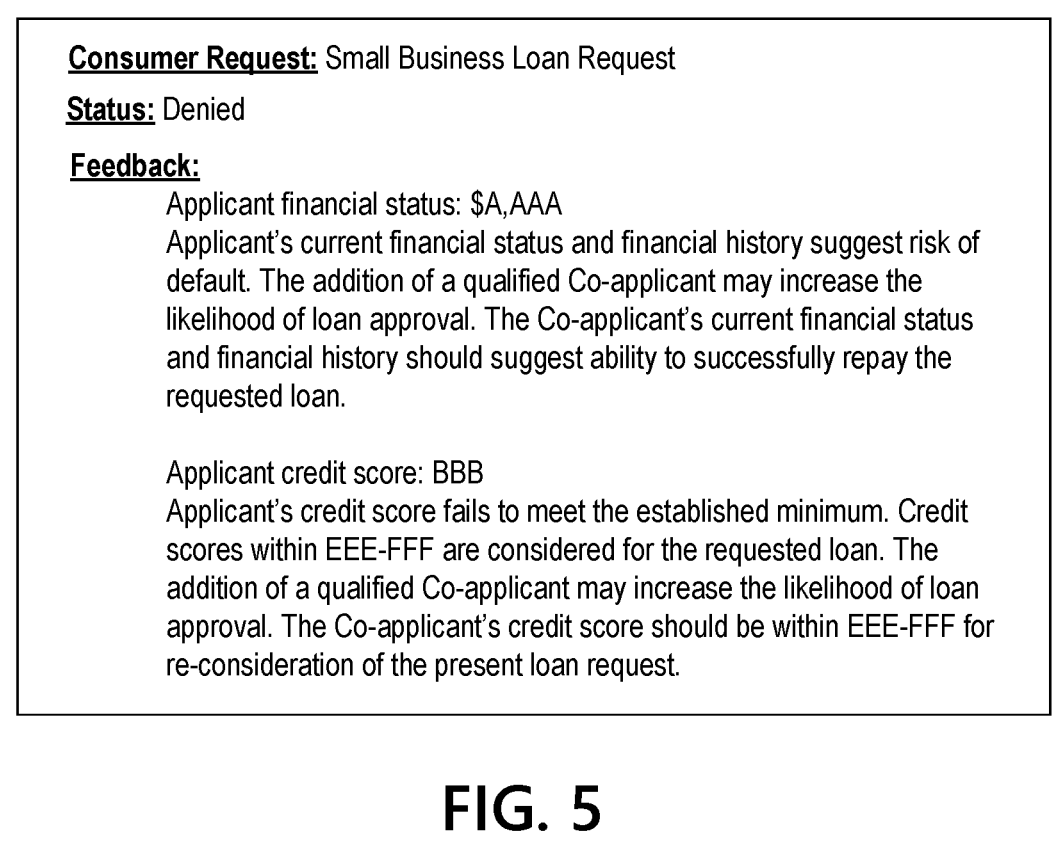

Consumer Request: Small Business Loan Request

Status: Denied

Feedback:

Applicant financial status: $A,AAA
Applicant's current financial status and financial history suggest risk of default. The addition of a qualified Co-applicant may increase the likelihood of loan approval. The Co-applicant's current financial status and financial history should suggest ability to successfully repay the requested loan.

Applicant credit score: BBB
Applicant's credit score fails to meet the established minimum. Credit scores within EEE-FFF are considered for the requested loan. The addition of a qualified Co-applicant may increase the likelihood of loan approval. The Co-applicant's credit score should be within EEE-FFF for re-consideration of the present loan request.

FIG. 5

INTELLIGENTLY AGGREGATING DATA USING A CONVOLUTIONAL NETWORK QUANTUM PROCESSOR

BACKGROUND

Aspects of the disclosure relate to hardware and software for intelligently aggregating data using a convolutional network quantum processor. In particular, one or more aspects of the disclosure may relate to training an artificial intelligence engine to analyze a consumer request and consumer data, determining a function that describes a relationship between dependencies within the consumer request, training a quantum processing model to analyze the function to determine a configuration of dependencies and corresponding consumer data values that may yield a maximum likelihood of success of the consumer request, and determining whether to approve or deny the consumer request based on the analysis by the quantum processing model.

Current data aggregation procedures associated with analyzing consumer transaction requests may require an enterprise organization to gather information from a consumer. Consequently, the enterprise organization may generate and transmit, to the consumer, a plurality of data requests (e.g., requests for personal identifiable information that describes the consumer, a financial history that corresponds to the consumer, a current financial status that corresponds to the consumer, or the like) in response to receiving a consumer request to interact with at least one enterprise organization service (e.g., submit a business acquisition application, inquire about consumer credit, or the like). The enterprise organization may sequentially process the consumer data to analyze the consumer request and to determine whether to allow or deny the consumer request. The enterprise organization may analyze each individual piece of consumer data prior to considering the consumer data as a whole. As such, the efficiency of current data aggregation procedures, and the efficiency of determining whether to approve or deny the consumer request, may be compromised due to a volume of consumer data to be processed.

Furthermore, under current data aggregation procedures, the enterprise organization might not maintain a consumer data database and/or a training dataset (e.g., the enterprise organization might not process current consumer requests using previously processed consumer requests that may be similar to current consumer requests, using previously analyzed consumer data that may be similar to current consumer data, and/or using determinations that correspond to the previously processed consumer requests). As such, in instances where the consumer transmits a plurality of requests to utilize a plurality of enterprise organization services, the consumer may receive, from the enterprise organization, a plurality of requests for consumer data. Consequently, the consumer may wait an extended period of time to receive a determination from the enterprise organization indicating approval or denial of each consumer request. Therefore, current data aggregation procedures might not offer the enterprise organization a method for streamlining communication with the consumer, intelligently aggregating consumer data, using an artificial intelligence model and parallel processing to analyze the consumer data, and/or using quantum processing logic to analyze a plurality of consumer requests.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with intelligently aggregating, in real-time or near real-time, data using a convolutional network quantum processor.

In accordance with one or more embodiments, a method may comprise, at a computing device including one or more processors and memory, receiving, from a consumer computing device, a request to initiate a transaction with an enterprise organization service. The method may comprise transmitting, to the consumer computing device and based on receiving the consumer request, a request for consumer data. The method may comprise receiving, from the consumer computing device, the requested consumer data. The method may comprise analyzing the consumer request to identify one or more dependencies that correspond to the consumer request. The method may comprise identifying, based on analyzing the consumer data, values that correspond to the dependencies. The method may comprise determining a likelihood of success of the transaction based on each combination of a dependency and a corresponding value. The method may comprise updating a training dataset using the combinations and the determined likelihoods of success. The method may comprise generating a convolutional network using the updated training dataset. The method may comprise determining, by an artificial intelligence model and using the convolutional network, a function that describes a relationship between the dependencies. The method may comprise analyzing, using a quantum processing model, the function to identify a configuration of dependencies that results in a maximum likelihood of success of the transaction. The method may comprise comparing the maximum likelihood of success to a satisfaction threshold value. The method may comprise, based on determining the maximum likelihood of success satisfies a satisfaction threshold, approving the consumer request. The method may comprise transmitting, to the consumer computing device, a notification indicating approval of the consumer request.

In accordance with one or more embodiments, a computing platform may comprise at least one processor, a communication interface communicatively coupled to the at least one processor, and memory storing computer-readable instructions that, when executed by the at least one processor, cause the computing platform to receive, from a consumer computing device, a request to initiate a transaction with an enterprise organization service. The computing platform may transmit, to the consumer computing device and based on receiving the consumer request, a request for consumer data. The computing platform may receive, from the consumer computing device, the requested consumer data. The computing platform may analyze the consumer request to identify one or more dependencies that correspond to the consumer request. The computing platform may identify, based on analyzing the consumer data, values that correspond to the dependencies. The computing platform may determine a likelihood of success of the transaction based on each combination of a dependency and a corresponding value. The computing platform may update a training dataset using the combinations and the determined likelihoods of success. The computing platform may generate a convolutional network using the updated training dataset. The computing platform may determine, by an artificial intelligence model and using the convolutional network, a function that describes a relationship between the dependencies. The computing platform may analyze, using a quantum processing model, the function to identify a configuration of dependencies that results in a maximum likelihood of success of the transaction. The computing platform may compare the maximum likelihood of success to a satisfaction threshold value. The computing platform may, based on determining the maximum likelihood of success satisfies a satisfaction threshold, approve the consumer request. The computing platform may transmit, to the consumer computing device, a notification indicating approval of the consumer request.

In accordance with one or more embodiments, one or more non-transitory computer-readable media storing instructions that, when executed by a computing platform comprising at least one processor, memory, and a communication interface, cause the computing platform to receive, from a consumer computing device, a request to initiate a transaction with an enterprise organization service. The instructions, when executed, may cause the computing platform to transmit, to the consumer computing device and based on receiving the consumer request, a request for consumer data. The instructions, when executed, may cause the computing platform to receive, from the consumer computing device, the requested consumer data. The instructions, when executed, may cause the computing platform to analyze the consumer request to identify one or more dependencies that correspond to the consumer request. The instructions, when executed, may cause the computing platform to identify, based on analyzing the consumer data, values that correspond to the dependencies. The instructions, when executed, may cause the computing platform to determine a likelihood of success of the transaction based on each combination of a dependency and a corresponding value. The instructions, when executed, may cause the computing platform to update a training dataset using the combinations and the determined likelihoods of success. The instructions, when executed, may cause the computing platform to generate a convolutional network using the updated training dataset. The instructions, when executed, may cause the computing platform to determine, by an artificial intelligence model and using the convolutional network, a function that describes a relationship between the dependencies. The instructions, when executed, may cause the computing platform to analyze, using a quantum processing model, the function to identify a configuration of dependencies that results in a maximum likelihood of success of the transaction. The instructions, when executed, may cause the computing platform to compare the maximum likelihood of success to a satisfaction threshold value. The instructions, when executed, may cause the computing platform to, based on determining the maximum likelihood of success satisfies a satisfaction threshold, approve the consumer request. The instructions, when executed, may cause the computing platform to transmit, to the consumer computing device, a notification indicating approval of the consumer request.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIG. 4 depicts an illustrative notification indicating approval of a consumer request based on intelligently aggregating data using a convolutional network quantum processor, in accordance with one or more example embodiments.

FIG. 5 depicts an illustrative notification indicating denial of a consumer request based on intelligently aggregating data using a convolutional network quantum processor, in accordance with one or more example embodiments.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1A:
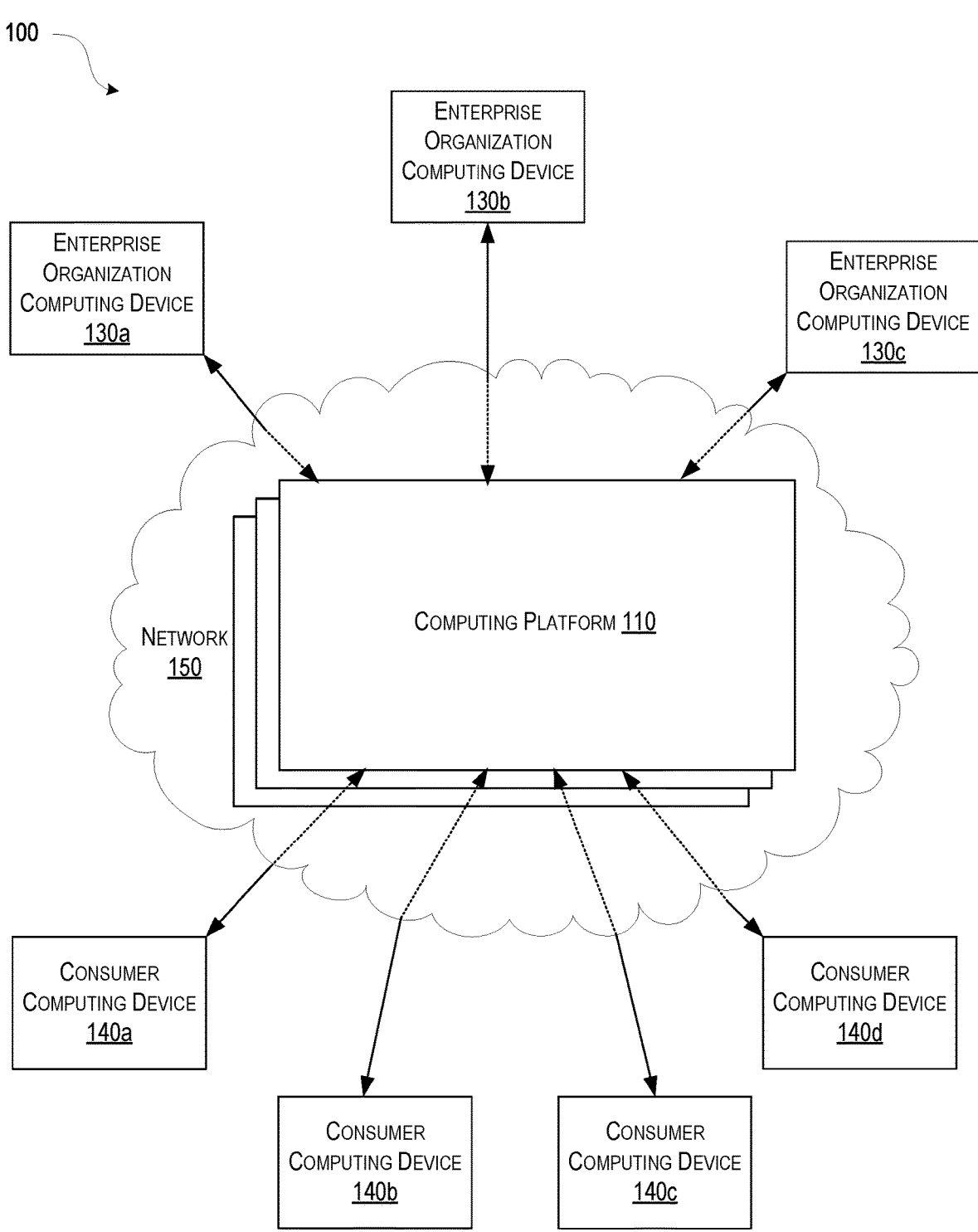
FIG. 1A depicts an illustrative example of a computer system for intelligently aggregating data using a convolutional network quantum processor, in accordance with one or more example embodiments.

As discussed above, current data aggregation procedures might not offer the enterprise organization a method for streamlining communication with the consumer, intelligently aggregating consumer data, using an artificial intelligence model and parallel processing to analyze the consumer data, and/or using quantum processing logic to analyze a plurality of consumer requests. Accordingly, proposed herein is a solution to the problem described above that includes intelligently aggregating data using a convolutional network quantum processor. For example, an enterprise organization computing device may receive, from a consumer computing device, a request to initiate a transaction with at least one enterprise organization service and/or program. The enterprise organization computing device may instruct an artificial intelligence model to request consumer data from the consumer computing device and to analyze the consumer data. The artificial intelligence model may parse the consumer request and the consumer data to identify dependencies associated with the consumer request, identify patterns between the current consumer request and previously processed consumer requests, and/or to group the consumer data and the consumer request based on the identified dependencies and patterns. The artificial intelligence model may generate a function that describes a relationship between the dependencies derived from the current consumer request. A quantum processing model may analyze the function, identify different states of the function based on different configurations of dependencies, and use quantum processing logic to determine a likelihood of success of each state of the function. The quantum processing model may identify a maximum likelihood of success of the current consumer request and may compare the maximum likelihood of success to a satisfaction threshold to determine whether to approve or deny the consumer request.
Computer Architecture FIG. 1A depicts an illustrative example of a computer system 100 that may be used for intelligently aggregating, in real-time or near real-time, data using a convolutional network quantum processor, in accordance with one or more aspects described herein. Computer system 100 may comprise one or more computing devices including at least computing platform 110, enterprise organization computing devices 130a-130c, and/or consumer computing devices 140a-140d.

While FIG. 1A depicts more than one enterprise organization computing device (e.g., enterprise organization computing devices 130a-130c) and more than one consumer computing device (e.g., consumer computing devices 140a-140d), each of enterprise organization computing devices 130a-130c and consumer computing devices 140a-140d may be configured in accordance with the features described herein. While the description herein may refer to enterprise organization computing device 130 and consumer computing device 140, it is important to note that the functions described in connection with enterprise organization computing device 130 may also be performed by any one of enterprise organization computing devices 130a-130c, and that the functions described in connection with consumer computing device 140 may also be performed by any one of consumer computing devices 140a-140d. While FIG. 1A depicts enterprise organization computing devices 130a-130c and consumer computing devices 140a-140d, more or fewer enterprise organization computing devices and consumer computing devices may exist within computer system 100. Enterprise organization computing devices 130a-130c and consumer computing devices 140a-140d are depicted in FIG. 1A for illustration purposes only and are not meant to be limiting.

Each one of enterprise organization computing devices 130a-130c and consumer computing devices 140a-140d may be configured to communicate with computing platform 110 through network 150. In some arrangements, computer system 100 may include additional computing devices and networks that are not depicted in FIG. 1A, which may also be configured to interact with computing platform 110.

Enterprise organization computing device 130 may receive, from consumer computing device 140, a request to initiate a transaction with at least one enterprise organization service and/or program. Enterprise organization computing device 130 may instruct computing platform 110 to analyze the consumer request and to gather consumer data that may be needed for determining whether to approve or deny the consumer request. Enterprise organization computing device 130 may receive, from computing platform 110, a notification indicating one of approval or denial of the consumer request.

Consumer computing device 140 may transmit, to enterprise organization computing device 130, a request to initiate a transaction with at least one enterprise organization service and/or program. Consumer computing device 140 may receive, from computing platform 110, a request for consumer data and may transmit the requested consumer data to computing platform 110. Consumer computing device 140 may receive, from computing platform 110, a notification indicating one of approval or denial of the consumer request. In some instances, the notification may describe at least one suggestion for increasing a likelihood of success of the transaction indicated in the consumer request and/or at least one suggestion for overcoming denial of the consumer request.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with enterprise organization computing device 130, consumer computing device 140, and/or additional computing devices.

Computing platform 110 may receive, from enterprise organization computing device 130, instructions to analyze a consumer request to initiate a transaction with at least one enterprise organization service and/or program. Computing platform 110 may transmit, to consumer computing device 140, a request for consumer data and may analyze the consumer data. Computing platform 110 may use the consumer data to generate a function that identifies and describes dependencies derived from the consumer request. Computing platform 110 may use the function to identify different configurations of dependencies and to determine, for each configuration of dependencies, a likelihood of success of the transaction indicated in the consumer request. Computing platform 110 may use the likelihoods of success to determine whether to approve or deny the consumer request.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in database 119, for data received from enterprise organization computing device 130 and/or consumer computing device 140.

Enterprise organization computing device 130 and consumer computing device 140 may be configured to interact with computing platform 110 through network 150. Network 150 may include one or more sub-networks (e.g., local area networks (LANs), wide area networks (WANs), or the like).

In some instances, enterprise organization computing device 130 and consumer computing device 140 may be configured to receive and transmit information corresponding to requests through particular channels and/or applications associated with computing platform 110 (e.g., via network 150). The requests submitted by enterprise organization computing device 130 and/or consumer computing device 140 may initiate the performance of particular computational functions at computing platform 110, such as the analysis of at least one consumer request to initiate a transaction with at least one enterprise organization service and/or program.

Figure 1B:
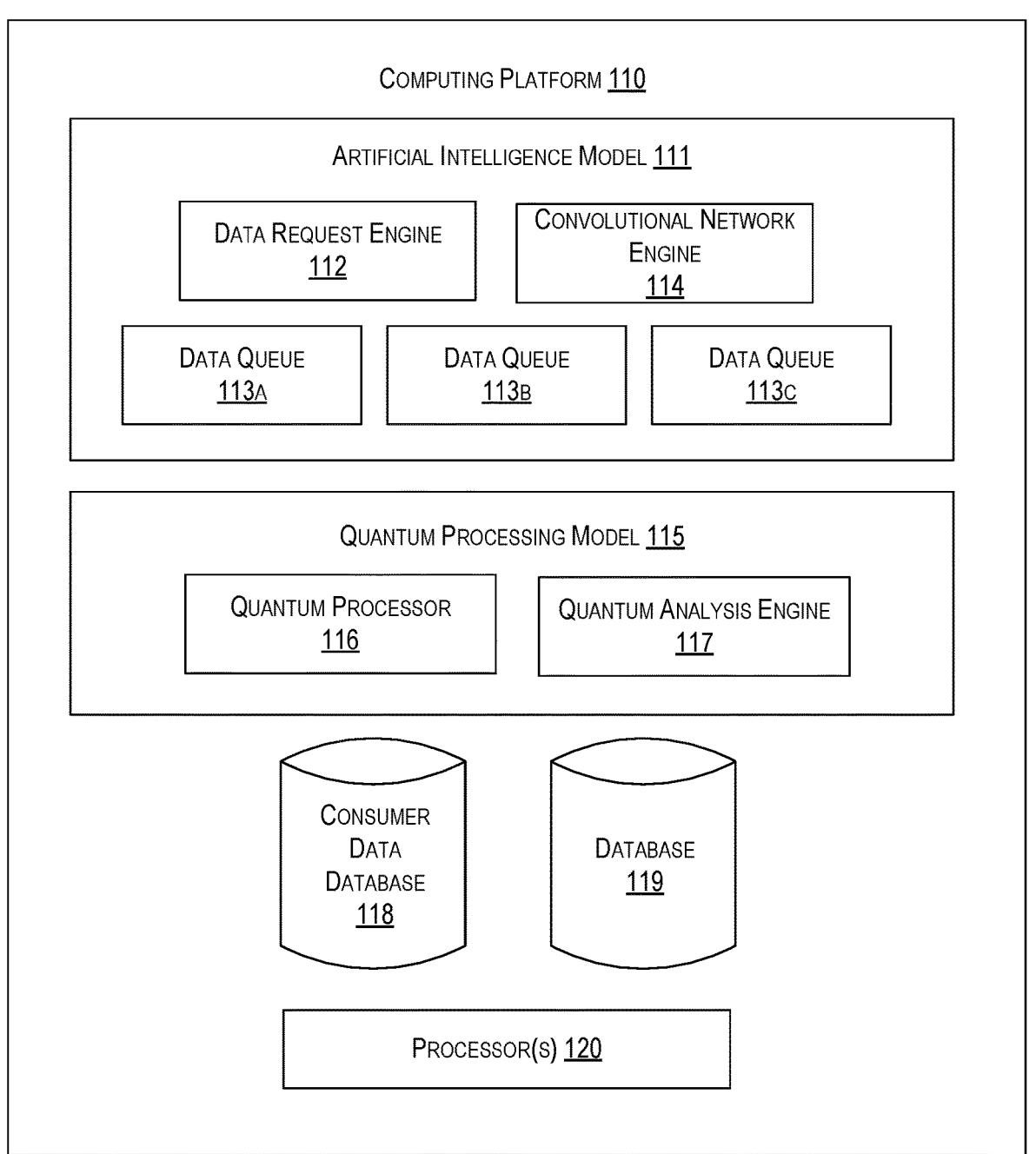
FIG. 1B depicts an illustrative example of the computing platform that may be used for intelligently aggregating data using a convolutional network quantum processor, in accordance with one or more example embodiments.

FIG. 1B depicts the components of computing platform 110 that may be used for intelligently aggregating, in real-time or near real-time, data using a convolutional network quantum processor, in accordance with one or more aspects described herein. Computing platform 110 may comprise artificial intelligence model 111, quantum processing model 115, consumer data database 118, database 119, and/or processor(s) 120. Artificial intelligence model 111 may comprise data request engine 112, data queues 113a-113c, and/or convolutional network engine 114. Quantum processing model 115 may comprise quantum processor 116 and/or quantum analysis engine 117.

While FIG. 1B depicts more than one data queue (e.g., data queues 113a-113c), each of data queues 113a-113c may be configured in accordance with the features described herein. While the description herein may refer to data queue 113, the functions described in connection with data queue 113 may also be performed by any one of data queues 113a-113c. While FIG. 1B depicts data queues 113a-113c, more or fewer data queues may exist within computer system 100. Data queues 113a-113c are depicted in FIG. 1B for illustration purposes only and are not meant to be limiting.

Artificial intelligence model 111, and the computing devices therein, may gather data that may be used to determine whether to approve or deny the consumer request, analyze the data, and prepare the data for parallel processing by quantum processing model 115. Artificial intelligence model 111 may receive, from enterprise organization computing device 130, instructions to analyze the consumer request.

Data request engine 112 may transmit, to consumer computing device 140, a request for consumer data that may be used for determining whether to approve or deny the consumer request. Data request engine 112 may receive and store the consumer data, and may push the consumer request and the consumer data to a data queue (e.g., data queue 113) that corresponds to the at least one enterprise organization service and/or program indicated in the consumer request. In some instances, data request engine 112 may receive, from data queue 113, instructions to request additional consumer data from consumer computing device 140.

Data queue 113 may parse the consumer request and the consumer data to determine whether additional consumer data may be needed to process the consumer request. If additional consumer data may be needed, data queue 113 may instruct data request engine 112 to request additional consumer data. Alternatively, if additional consumer data might not be needed, data queue 113 may push the consumer data and the consumer request to convolutional network engine 114.

Convolutional network engine 114 may identify dependencies within the consumer request and may determine values that correspond to the dependencies (e.g., using the consumer data). Convolutional network engine 114 may compare the current consumer request and the dependencies to previously processed consumer requests to identify patterns and/or similarities, and may determine a likelihood of success of the consumer request, and the transaction indicated therein, based on the comparison. Convolutional network engine 114 may alter the consumer data values that correspond to each dependency within a configuration of dependencies and/or may generate altered configurations of dependencies. Convolutional network engine 114 may determine a likelihood of success of each altered configuration of dependencies, and may pool configurations of dependencies together based on determining the configurations correspond to similar (e.g., the same, within a pre-determined range of, or the like) likelihoods of success. Convolutional network engine 114 may run the pooled data through a convolutional network to generate a function that describes a relationship between the dependencies (e.g., of the configuration of dependences, of an altered configuration, or the like) and the corresponding likelihood of success.

Quantum processing model 115 may retrieve and process the function generated by artificial intelligence model 111, using at least one quantum processing gate and at least one quantum search algorithm, to determine whether to approve or deny the consumer request.

Quantum processor 116 may identify the configuration of dependencies and each altered configuration of dependencies as a different state of the function. Quantum processor 116 may process each state of the function to derive a range of likelihoods of success.

Quantum analysis engine 117 may identify a maximum likelihood of success score, wherein the maximum likelihood of success score may identify the configuration of dependencies (or an altered configuration of dependencies) and corresponding values that may result in a successful consumer transaction. Quantum analysis engine 117 may determine whether to approve or deny the consumer request based on comparing the maximum likelihood of success to a satisfaction threshold value. Quantum analysis engine 117 may transmit a notification to enterprise organization computing device 130 and consumer computing device 140 indicating one of approval or denial of the consumer request.

Intelligently Aggregating Data Using a Convolutional Network Quantum Processor

Figure 2A:
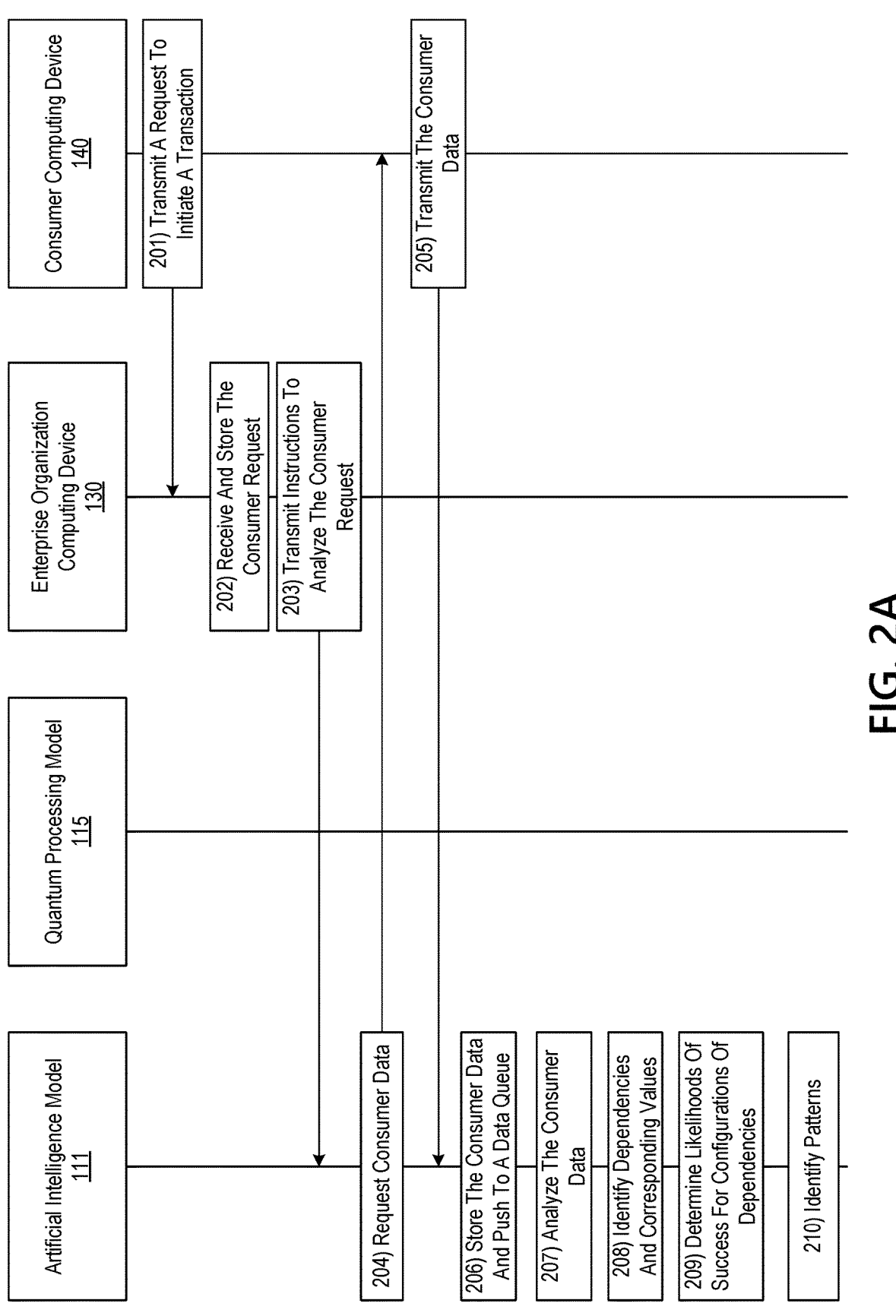
FIGS. 2A-2C depict an illustrative event sequence for intelligently aggregating data using a convolutional network quantum processor, in accordance with one or more example embodiments.
Figure 2B:
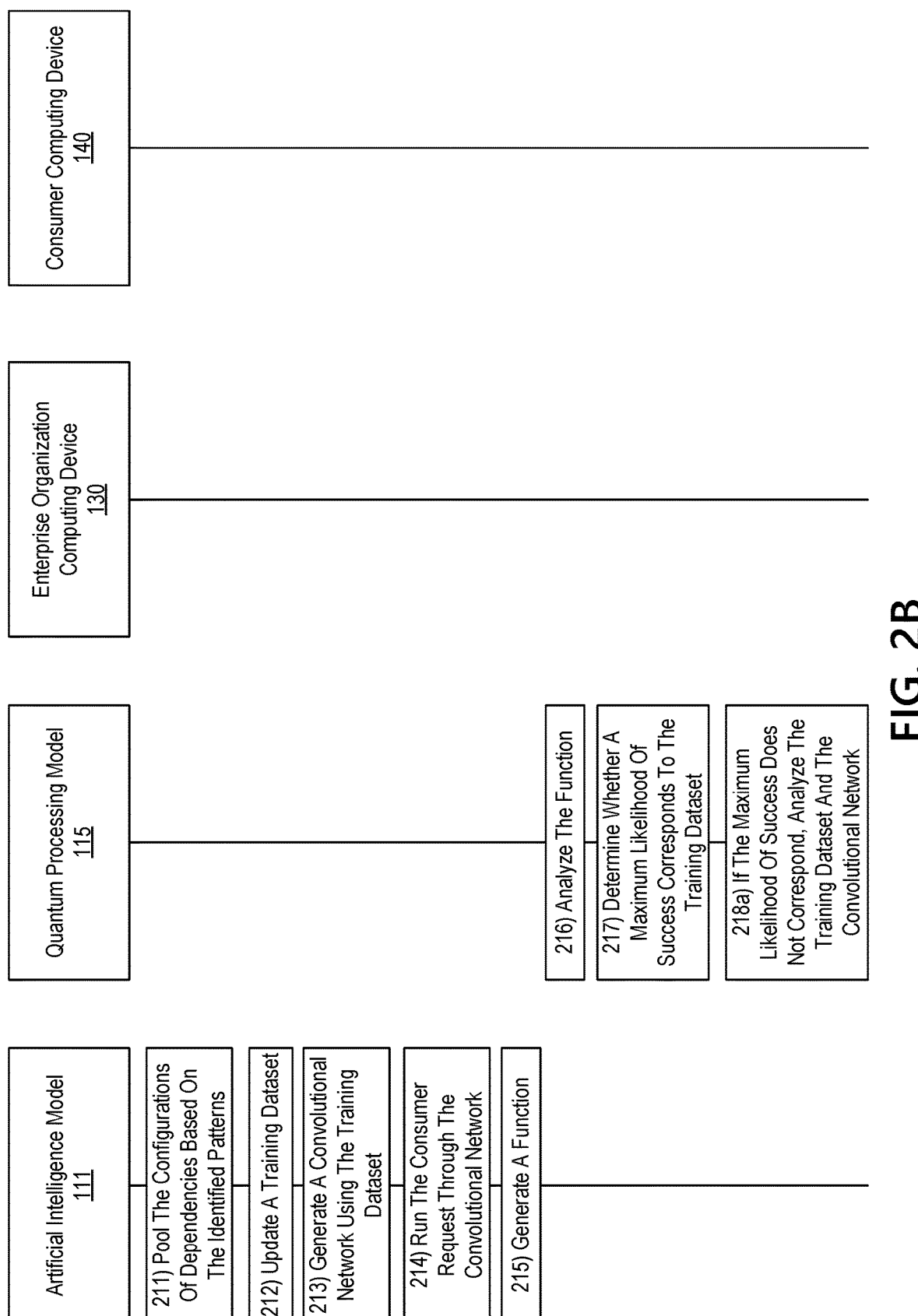
Figure 2C:
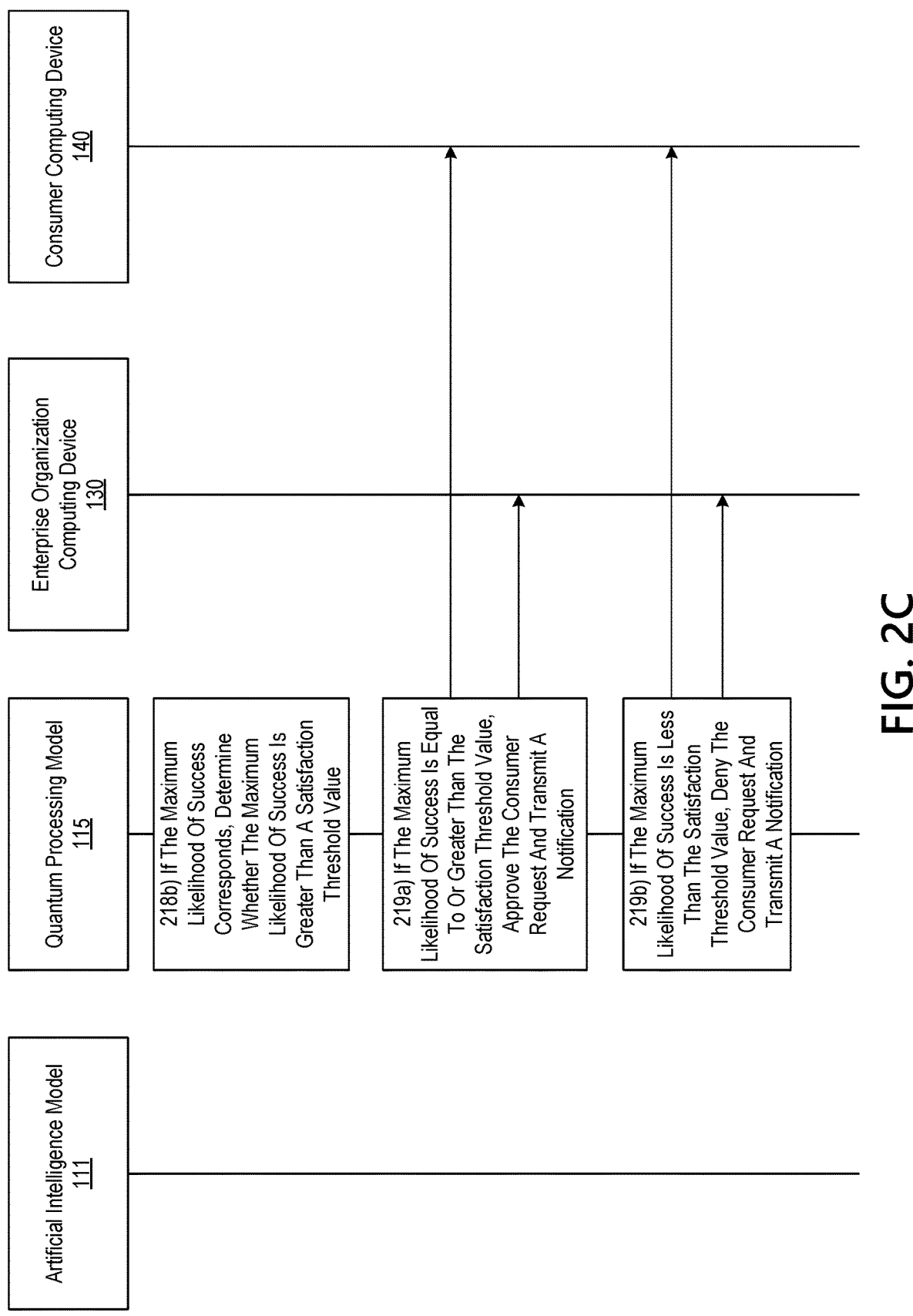

FIGS. 2A-2C depict an illustrative event sequence for intelligently aggregating, in real-time or near real-time, data using a convolutional network quantum processor, in accordance with one or more aspects described herein. While aspects described with respect to FIGS. 2A-2C include the evaluation of a single consumer request, a plurality of consumer requests may be received and evaluated (e.g., in parallel) without departing from the present disclosure. One or more processes performed in FIGS. 2A-2C may be performed in real-time or near real-time and one or more steps or processes may be added, omitted, or performed in a different order, without departing from the present disclosure.

Referring to FIG. 2A, at step 201, consumer computing device 140 may generate and transmit, to enterprise organization computing device 130 and across network 150, a request to initiate a transaction associated with at least one enterprise organization service and/or program (e.g., establish a business account, submit a small business acquisition application, submit a consumer request for a line of consumer credit, submit a business request for a line of commercial credit, or the like).

At step 202, enterprise organization computing device 130 may receive the consumer request and store the consumer request in consumer data database 118. Consumer data database 118 may store a plurality of consumer requests received from consumer computing devices 140a-140d as well as consumer data generated by consumer computing devices 140a-140d. Consumer data database 118 may further store details derived from analyses of the plurality of consumer requests and corresponding consumer data, and details derived from analyses of functions that describe each consumer request of the plurality of consumer requests, as discussed in detail below. Consumer data database 118 may also store, for each consumer request, a plurality of likelihoods of success (e.g., a numerical value, a percentage, or the like) derived from the analyses of the functions. Moreover, consumer data database 118 may comprise, for each consumer request, an indication of whether the consumer request was approved or denied.

Access to consumer data database 118 may differ depending on the computing device that is requesting access (e.g., a hierarchy of accessibility). Enterprise organization computing device 130, data request engine 112, convolutional network engine 114, and quantum analysis engine 117 may be associated with a first level of accessibility (e.g., a least restrictive level of accessibility). Enterprise organization computing device 130, data request engine 112, convolutional network engine 114, and quantum analysis engine 117 may perform functions on the data stored within consumer data database 118 (e.g., access the data, add data, remove data, modify data, or the like). The remaining computing devices within computing platform 110 may be associated with a second level of accessibility (e.g., a more restrictive level of accessibility than the first level of accessibility). The remaining computing devices within computing platform 110 may access the data stored within consumer data database 118, but might not be permitted to add, remove, and/or modify the data stored within consumer data database 118.

At step 203, enterprise organization computing device 130 may instruct artificial intelligence model 111 to request consumer data from consumer computing device 140. The instructions may include the consumer request to initiate a transaction associated with at least one enterprise organization service and/or program, and may indicate consumer data that may be used to analyze the consumer request (e.g., personal identifiable information that corresponds to a consumer applicant and/or a consumer co-applicant, a financial history that corresponds to the consumer applicant and/or the consumer co-applicant, a current financial status that corresponds to the consumer applicant and/or the consumer co-applicant, or the like).

At step 204, data request engine 112 of artificial intelligence model 111 may receive the instructions from enterprise organization computing device 130. In accordance with the received instructions, data request engine 112 may transmit a request for consumer data to consumer computing device 140.

At step 205, consumer computing device 140 may receive the request for consumer data from data request engine 112. Consumer computing device 140 may gather the requested consumer data and may transmit the requested consumer data to data request engine 112.

At step 206, data request engine 112 may receive the consumer data from consumer computing device 140 and may store the consumer data within consumer data database 118. Data request engine 112 may push the consumer request and the consumer data to a data queue (e.g., one of data queues 113a-113c) that corresponds to the enterprise organization service and/or program indicated in the consumer request. To do so, data request engine 112 may parse the consumer request (e.g., using at least one natural language processing (NLP) algorithm, or the like) to identify the enterprise organization service and/or program indicated in the consumer request, and may push the consumer request and the consumer data to data queue 113 based on determining data queue 113 corresponds to the enterprise organization service and/or program.

At step 207, data queue 113 may analyze the consumer request and consumer data. Data queue 113 may parse (e.g., using the at least one natural language processing (NLP) algorithm, or the like) the consumer request to identify the consumer data that may be used to analyze the consumer request. Data queue 113 may also parse the received consumer data to determine whether additional consumer data may be needed. Based on determining additional consumer data may be needed, data queue 113 may instruct data request engine 112 to request additional consumer data from consumer computing device 140. In some instances, the instructions may indicate the additional consumer data that may be needed. Alternatively, based on determining additional consumer data might not be needed, data queue 113 may push the consumer data and the consumer request to convolutional network engine 114.

At step 208, convolutional network engine 114 may parse the consumer request to identify at least one consumer computing device that may be associated with the consumer request (e.g., a consumer computing device associated with a consumer applicant, a different consumer computing device associated with a consumer co-applicant, or the like). Convolutional network engine 114 may further parse the consumer request to identify dependencies. A dependency may correspond to a factor and/or feature that may increase and/or decrease a likelihood of success of the consumer request (and/or the transaction indicated therein) and/or may influence the approval or denial of the consumer request. For example, where the consumer request is a request for a small business loan, dependencies may be the consumer applicant's credit score, whether a consumer co-applicant is listed on a small business loan application, the consumer co-applicant's credit score, whether the consumer applicant's financial history satisfies loan repayment requirements, whether the consumer co-applicant's financial history increases the likelihood of securing the loan, or the like. Convolutional network engine 114 may parse the consumer data to identify values that correspond to each dependency.

At step 209, convolutional network engine 114 may determine a likelihood of success that corresponds to a configuration of dependencies, wherein the configuration of dependencies may comprise the dependencies derived from the current consumer request and the corresponding consumer data values. To determine the likelihood of success, convolutional network engine 114 may access historical data within consumer data database 118 (e.g., previously processed consumer requests and/or details that correspond to the previously processed consumer requests, or the like). Convolutional network engine 114 may compare the current consumer request to the previously processed consumer requests to identify at least one similar previously processed consumer request. Based on identifying the at least one similar previously processed consumer request, convolutional network engine 114 may compare the configuration of dependencies derived from the current consumer request to a configuration of dependencies associated with the at least one similar previously processed consumer request.

In particular, convolutional network engine 114 may compare the values that correspond to the dependencies associated with the previously processed consumer request to the consumer data values that correspond to the configuration of dependencies derived from the current consumer request. Based on determining the consumer data values that correspond to the configuration of dependencies derived from the current consumer request are within a pre-determined range of the values that correspond to the dependencies associated with the previously processed consumer request, convolutional network engine 114 may parse consumer data database 118 to determine whether the previously processed consumer request was approved or denied.

The approval or denial of the previously processed consumer request may indicate a pre-determined likelihood of success that convolutional network engine 114 may adjust to account for differences between the current consumer request and the previously processed consumer request. For example, if the previously processed consumer request was approved, then convolutional network engine 114 may determine that the likelihood of success of the current consumer request may fall within a pre-determined range of the likelihood of success indicating approval of previously processed consumer request. Similarly, if the previously processed consumer request was denied, then convolutional network engine 114 may determine that the likelihood of success of the current consumer request may fall within a pre-determined range of the likelihood of success indicating denial of the previously processed consumer request.

In either instance, convolutional network engine 114 may determine the likelihood of success of the current consumer request by adjusting the likelihood of success of the previously processed consumer request based on the differences between the configuration of dependencies derived from the current consumer request and the configuration of dependencies associated with the previously processed consumer request. In some instances, convolutional network engine 114 may receive, from enterprise organization computing device 130, guidelines for adjusting the likelihood of success (e.g., critical dependencies that correspond to particular consumer requests, a range within which critical dependency values should fall, weights associated with the critical dependencies, weights associated with a corresponding range of consumer data values, or the like). Convolutional network engine 114 may analyze the accuracy of the likelihood of success by determining whether the likelihood of success falls within the pre-determined ranges of the likelihood of success indicating either approval or denial of the previously processed consumer request.

However, based on determining the consumer data values that correspond to the configuration of dependencies derived from the current consumer request are not within the pre-determined range of the values that correspond to the dependencies associated with the previously processed consumer request, convolutional network engine 114 may determine the likelihood of success that corresponds to the current consumer request using the guidelines received from enterprise organization computing device 130. Convolutional network engine 114 may store the determined likelihood of success associated with the current consumer request within consumer data database 118.

At step 210, convolutional network engine 114 may identify patterns within consumer data database 118 (e.g., patterns between the current consumer request, the configuration of dependencies derived from the current consumer request, the likelihood of success of the current consumer request, the previously processed consumer requests, the configurations of dependencies associated with the previously processed consumer requests, the likelihoods of success of the previous consumer requests, or the like). To do so, convolutional network engine 114 may continuously alter the configuration of dependencies derived from the current consumer request (e.g., remove at least one dependency, modify a value associated with at least one dependency, or the like), and may determine a likelihood of success of the current consumer request based on the altered configuration of dependencies (e.g., using the method described above).

Convolutional network engine 114 may compare the altered configurations of dependencies and the corresponding likelihoods of success to the configuration of dependencies derived from the current consumer request and the corresponding consumer data values. Convolutional network engine 114 may analyze the comparison to identify patterns that may influence the likelihood of success of the current consumer request (e.g., whether the inclusion of a particular dependency increases (or decreases) the likelihood of success, whether the omission of a particular dependency increases (or decreases) the likelihood of success, whether the inclusion of additional dependencies increase (or decrease) the likelihood of success, or the like). Convolutional network engine 114 may store the identified patterns within consumer data database 118.

Referring to FIG. 2B, at step 211, convolutional network engine 114 may pool the data within consumer data database 118 based on the identified patterns. To do so, convolutional network engine 114 may parse the identified patterns and may determine patterns that indicate a likelihood of success associated with approval of the consumer request as well as patterns that indicate a likelihood of success associated with denial of the consumer request. Convolutional network engine 114 may pool the patterns that indicate a likelihood of success associated with approval of the consumer request (e.g., the configurations of dependencies and corresponding values that suggest the consumer request may be approved, or the like). Similarly, convolutional network engine 114 may pool the patterns that indicate a likelihood of success associated with denial of the consumer request (e.g., the configurations of dependencies and corresponding values that suggest the consumer request may be denied, or the like).

At step 212, convolutional network engine 114 may use the pooled data and the data within consumer data database 118 to update a training dataset. The training dataset may comprise the previously processed consumer requests, details that describe the previously processed consumer requests (e.g., a plurality of configurations of dependencies and corresponding values, likelihoods of success that correspond to each configuration of dependencies, or the like), and/or details derived from the previously processed consumer requests (e.g., altered configurations of dependencies, likelihoods of success based on the altered configurations of dependencies, or the like). The training dataset may be used to train a convolutional network that may be used to further analyze the current consumer request. Convolutional network engine 114 may store a copy of the training dataset within consumer data database 118.

At step 213, convolutional network engine 114 may use the training dataset to generate the convolutional network, which may be used to parse the current consumer request and generate a function that describes relationships between each dependency of the configuration of dependencies derived from the current consumer request. Convolutional network engine 114 may transmit the training dataset and processing instructions to the convolutional network. The instructions may indicate a projected input and/or an expected output of the convolutional network. In particular, the instructions may indicate that the projected input may comprise at least one of the current consumer request, the configuration of dependencies derived from the current consumer request, and/or consumer data values that correspond to dependencies. The instructions may further indicate that the expected outcome may comprise a function (e.g., a linear function, or the like) that may describe the relationship between the dependencies (e.g., whether the likelihood of success of the current consumer request may decrease (or increase) based on the inclusion (or omission) of a particular dependency, or the like).

The convolutional network may continuously parse and analyze the training dataset and/or updated training dataset received from convolutional network engine 114 to determine a plurality of methods for manipulating the input data and generating the function. As the convolution network continuously parses and analyzes the training dataset, the convolutional network may refine the processing procedures conducted therein (e.g., and may increase the accuracy of the generated functions, or the like).

At step 214, convolutional network engine 114 may run the current consumer request through the convolutional network. To do so, convolutional network engine 114 may transmit, as input to the convolutional network, the current consumer request, the configuration of dependencies derived from the current consumer request, and/or consumer data values that correspond to the dependencies.

At step 215, the convolutional network may analyze the input data using the training dataset to generate the function. The convolutional network may compare each dependency of the configuration of dependencies derived from the current consumer request (and the corresponding consumer data values) to the dependencies indicated in the training dataset (and the corresponding values). Each comparison may indicate whether the inclusion (or omission) of at least one dependency of the configuration of dependencies derived from the current consumer request may result in approval or denial of the current consumer request. The convolutional network may generate different combinations of dependencies derived from the current consumer request and may compare the different combinations to combinations of dependencies within the training dataset. Similarly, each comparison may indicate whether the inclusion (or omission) of at least one different combination of dependencies derived from the current consumer request may result in approval or denial of the current consumer request. The convolutional network may generate the function based on the comparisons, wherein the function may identify the relationship between each dependency derived from the current consumer request and may indicate whether the relationships are likely to increase (or decrease) the likelihood of success of the current consumer request. For example, the comparison may indicate that the inclusion of a combination of at least two particular dependencies derived from the current consumer request increases the likelihood of success of the current consumer request. As a result, the function may identify the at least two particular dependencies and may describe how the inclusion of the at least two particular dependencies may affect the current consumer request.

In some instances, the function may comprise the analysis of the configuration of dependencies derived from the current consumer request and/or an analysis of the different combinations of dependencies. The analysis of the different combinations of dependencies may describe how the likelihood of success of the current consumer request may fluctuate based on the inclusion (or omission) of particular combinations.

At step 216, quantum processing model 115 may retrieve the function from the convolutional network and may analyze the function using quantum processing logic (e.g., quantum parallelism, superimposition, or the like). The analysis of the function may indicate a plurality of relationships between the dependencies derived from the current consumer request and may indicate how the likelihood of success of the current consumer request may fluctuate based on modifications to the relationships (e.g., different configurations of dependencies derived from the current consumer request, different corresponding values, or the like). Therefore, the analysis of the function may ultimately indicate a plurality of methods for achieving different likelihoods of success based on the different configurations of dependencies derived from the current consumer request. Quantum processing model 115 may be interested in identifying a maximum likelihood of success associated with the current consumer request. To do so, quantum processing model 115 may determine a likelihood of success for each of the different configurations of dependencies derived from the current consumer request and may compare the likelihoods of success to identify the maximum likelihood of success. Quantum processing model 115 may use quantum processing logic to analyze the different configurations of dependencies in parallel (e.g., as opposed to sequentially analyzing the different configurations, or the like).

The different configurations of dependencies derived from the current consumer request may each correspond to a different state of the function. Quantum processor 116 may process each state of the function in parallel using at least one quantum processing gate (e.g., a Hadamard transform, wherein the Hadamard transform may correspond to:

$$\frac{1}{\sqrt{2^n}} \sum_{i=0}^{2^n-1} |x\rangle).$$

Quantum processor 116 may superimpose a plurality of quantum processing gates such that each quantum processing gate may analyze a different state of the function and may generate a likelihood of success of the current consumer request based on the configuration of dependencies that corresponds to the state of the function. As such, quantum processor 116 may generate a range of likelihoods of success (e.g., may generate a range of output values of the function using the plurality of quantum processing gates, or the like), wherein the range may comprise a maximum likelihood of success. The maximum likelihood of success may correspond to a particular configuration of dependencies that may have the greatest likelihood of resulting in approval of the consumer request.

At step 217, quantum analysis engine 117 may analyze the maximum likelihood of success and corresponding values to determine the accuracy of the maximum likelihood of success as well as the accuracy of the training dataset used to generate the convolutional network. To do so, quantum analysis engine 117 may compare the maximum likelihood of success to the training dataset (e.g., to determine whether the maximum likelihood of success and the corresponding configuration of dependencies were previously identified during the analysis of the consumer request, or the like). The previous identification of the maximum likelihood of success within the training dataset may indicate whether the maximum likelihood of success corresponds to the data within the training dataset (e.g., at least one of a plurality of configurations of dependencies, altered configurations of dependencies, and/or a likelihood of success that corresponds to each configuration and/or altered configuration) and/or whether a combination of the data within the training dataset may result in the maximum likelihood of success.

Quantum analysis engine 117 may use at least one quantum search algorithm (e.g., Grover's algorithm, or the like) to determine whether the maximum likelihood of success was previously identified. Quantum analysis engine 117 may parse the configuration of dependencies and the corresponding values that result in the maximum likelihood of success. For each dependency associated with the maximum likelihood of success and the corresponding value, quantum analysis engine 117 may parse consumer data database 118 to determine whether the training dataset comprises the same (e.g., similar, within a pre-determined range, or the like) dependency and corresponding value.

If, at step 217, the at least one quantum search algorithm indicates that at least one dependency associated with the maximum likelihood of success might not correspond to the data within the training dataset, then, at step 218a, quantum analysis engine 117 may analyze the data within the training dataset and the convolutional network. Quantum analysis engine 117 may parse consumer data database 118 to identify the configuration of dependencies derived from the current consumer request and the altered configurations of dependencies generated therefrom. Quantum analysis engine 117 may identify differences between the configuration of dependencies that corresponds to the maximum likelihood of success and the plurality of configurations within the training dataset. Quantum analysis engine 117 may transmit a notification to convolutional network engine 114, wherein the notification may indicate the identified differences and may comprise instructions to update and analyze the training dataset based on the identified differences. Moreover, quantum analysis engine 117 may determine that the maximum likelihood of success might not be accurate (e.g., the maximum likelihood of success may be based on data that might not be reflected in the training dataset, the maximum likelihood of success may be based on a configuration of dependencies that convolutional network engine 114 might not have identified, or the like).

Alternatively, if, at step 217, the at least one quantum search algorithm indicates that the configuration of dependencies associated with the maximum likelihood of success corresponds to the data within the training dataset, then, referring to FIG. 2C and at step 218b, quantum analysis engine 117 may determine that the maximum likelihood of success may be accurate and may compare the maximum likelihood of success to a satisfaction threshold value. The satisfaction threshold value may indicate a minimum likelihood of success that may be required for approval of the current consumer request.

If, at step 218b, quantum analysis engine 117 determines that the maximum likelihood of success is equal to or greater than the satisfaction threshold value, then, at step 219a, quantum analysis engine 117 may approve the current consumer request. Quantum analysis engine 117 may generate a notification indicating approval of the current consumer request and may transmit the notification to enterprise organization computing device 130 and consumer computing device 140. Transmitting the notification may cause the notification to be displayed on a display of enterprise organization computing device 130 and/or consumer computing device 140. Quantum analysis engine 117 may also indicate, in consumer data database 118, approval of the current consumer request (e.g., such that the analysis and outcome of the current consumer request may be used to further train the convolutional network during the analysis of subsequently received consumer requests, or the like).

In some instances, the notification may describe the analysis of the current consumer request and may comprise at least one suggestion that may result in a successful transaction with the at least one enterprise organization service and/or program indicated in the current consumer request. FIG. 4 depicts an illustrative notification indicating approval of the current consumer request. As illustrated in FIG. 4, the notification may identify the current consumer request, a status of the current consumer request (e.g., a determination that corresponds to the current consumer request, or the like), and/or feedback on the analysis of the current consumer request. The feedback may indicate at least one dependency that was extracted from the current consumer request as well as the corresponding consumer data value that may result in a successful transaction (e.g., based on the configuration of dependencies and corresponding values associated with the maximum likelihood of success, or the like). The at least one suggestion may also indicate at least one dependency and the corresponding consumer data value that may impact (e.g., reduce, weaken, or the like) the success of the transaction.

Alternatively, if, at step 218b, quantum analysis engine 117 determines that the maximum likelihood of success is less than the satisfaction threshold value, then, at step 219b, quantum analysis engine 117 may deny the current consumer request. Quantum analysis engine 117 may generate a notification indicating denial of the current consumer request and may transmit the notification to enterprise organization computing device 130 and consumer computing device 140. Transmitting the notification may cause the notification to be displayed on a display of enterprise organization computing device 130 and/or consumer computing device 140. Quantum analysis engine 117 may also indicate, in consumer data database 118, denial of the current consumer request (e.g., such that the analysis and outcome of the current consumer request may be used to further train the convolutional network during the analysis of subsequently received consumer requests, or the like).

In some instances, the notification may describe the analysis of the current consumer request and may identify at least one dependency and corresponding consumer data value that may have impacted (e.g., reduced, weakened, or the like) the success of the transaction. FIG. 5 depicts an illustrative notification indicating denial of the current consumer request. As illustrated in FIG. 5, the notification may identify the current consumer request, a status of the current consumer request (e.g., a determination that corresponds to the current consumer request, or the like), and/or feedback on the analysis of the current consumer request. The feedback may comprise at least one suggestion for overcoming the at least one dependency that may have contributed to the denial of the consumer request. Additionally or alternatively, the description may indicate a range of consumer data values that corresponds to the at least one dependency and that may result in a successful transaction and/or approval of the current consumer request.

Figure 3:
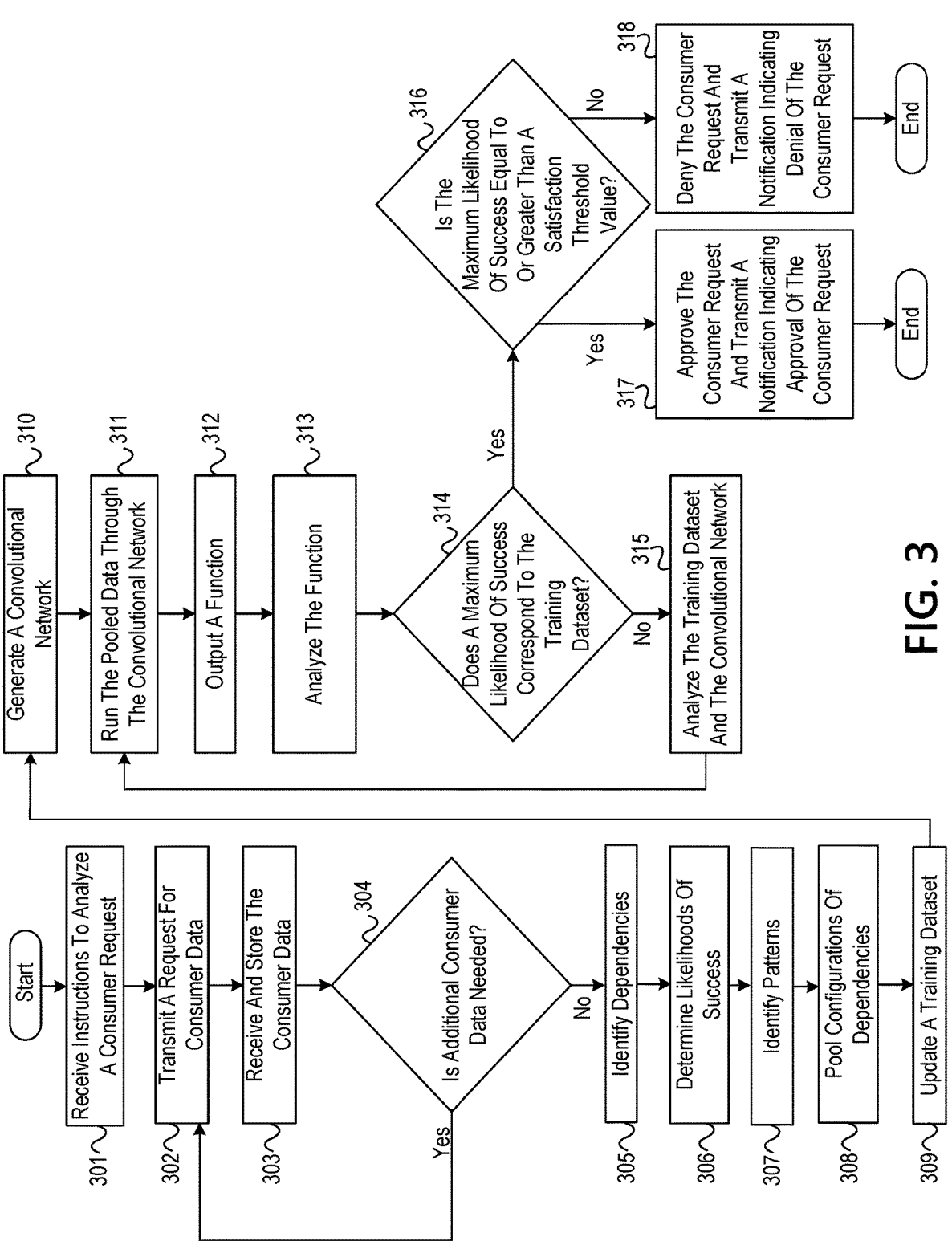
FIG. 3 depicts an illustrative method for intelligently aggregating data using a convolutional network quantum processor, in accordance with one or more example embodiments.

FIG. 3 depicts an illustrative event sequence for intelligently aggregating, in real-time or near real-time, data using a convolutional network quantum processor, in accordance with one or more aspects described herein. While aspects described with respect to FIG. 3 include the evaluation of a single consumer request, a plurality of consumer requests may be evaluated (e.g., in parallel) without departing from the present disclosure.

Referring to FIG. 3A, at step 301, data request engine 112 of artificial intelligence model 111 may receive, from enterprise organization computing device 130, instructions to request consumer data from consumer computing device 140 based on receiving a consumer request to initiate a transaction with at least one enterprise organization service and/or program. The instructions may include the consumer request and/or may indicate consumer data that may be used to analyze the consumer request.

At step 302, data request engine 112 may transmit a request for consumer data to consumer computing device 140. Consumer computing device 140 may gather the requested consumer data and may transmit the requested consumer data to data request engine 112.

At step 303, data request engine 112 may receive the consumer data from consumer computing device 140 and may store the consumer data within consumer data database 118. Data request engine 112 may push the consumer request and the consumer data to data queue 113 based on determining data queue 113 corresponds to the enterprise organization service and/or program indicated in the consumer request.

At step 304, data queue 113 may parse the consumer request to identify the consumer data that may be used to analyze the consumer request. Data queue 113 may also parse the received consumer data to determine whether additional consumer data may be needed. If, at step 304, data queue 113 determines that additional consumer data may be needed to further analyze the current consumer request, then data queue 113 may instruct data request engine 112 to transmit, to consumer computing device 140, a request for additional consumer data.

Alternatively, if, at step 304, data queue 113 determines that additional consumer data might not be needed to further analyze the current consumer request, then, at step 305, convolutional network engine 114 may parse the consumer request to identify dependencies and may parse the consumer data to identify values that correspond to each dependency.

At step 306, convolutional network engine 114 may determine a likelihood of success that corresponds to a configuration of dependencies, wherein the configuration of dependencies may comprise the dependencies derived from the current consumer request and the corresponding values. Convolutional network engine 114 may compare the current consumer request to previously processed consumer requests to identify at least one similar previously processed consumer request. Based on identifying the at least one similar previously processed consumer request, convolutional network engine 114 may compare the configuration of dependencies derived from the current consumer request to a configuration of dependencies associated with the at least one similar previously processed consumer request. Convolutional network engine 114 may determine the likelihood of success of the current consumer request by adjusting a likelihood of success of the previously processed consumer request based on differences between the configuration of dependencies derived from the current consumer request and the configuration of dependencies associated with the previously processed consumer request.

At step 307, convolutional network engine 114 may identify patterns within consumer data database 118 by continuously altering the configuration of dependencies derived from the current consumer request and determining a likelihood of success of the current consumer request based on the altered configuration of dependencies. Convolutional network engine 114 may compare the altered configurations of dependencies and the corresponding likelihood of success to the configuration of dependencies derived from the current consumer request and the corresponding consumer data values to identify patterns that may influence the likelihood of success of the current consumer request.

At step 308, convolutional network engine 114 may pool the data within consumer data database 118 based on the identified patterns. Convolutional network engine 114 may parse the identified patterns and may determine patterns that indicate a likelihood of success associated with approval of the consumer request as well as patterns that indicate a likelihood of success associated with denial of the consumer request. Convolutional network engine 114 may pool the patterns that indicate a likelihood of success associated with approval of the consumer request and may pool the patterns that indicate a likelihood of success associated with denial of the consumer request.

At step 309, convolutional network engine 114 may use the pooled data and the data within consumer data database 118 to update a training dataset.

At step 310, convolutional network engine 114 may use the training dataset to generate a convolutional network, which may be used to parse the current consumer request and generate a function that describes relationships between each dependency of the configuration of dependencies derived from the current consumer request. The convolutional network may continuously parse and analyze the training dataset to determine a plurality of methods for manipulating the input data and generating the function.

At step 311, convolutional network engine 114 may transmit, as input to the convolutional network, the current consumer request, the configuration of dependencies derived from the current consumer request, and/or consumer data values that correspond to the dependencies. Convolutional network engine 114 may run the input data through the convolutional network.

At step 312, the convolutional network may compare each dependency of the configuration of dependencies derived from the current consumer request (and the corresponding consumer data values) to the dependencies indicated in the training dataset (and the corresponding values) to generate the function. Each comparison may indicate whether the inclusion (or omission) of at least one dependency of the configuration of dependencies derived from the current consumer request may result in approval or denial of the current consumer request. The convolutional network may generate different combinations of dependencies derived from the current consumer request and may compare the different combinations to combinations of dependencies within the training dataset. Similarly, each comparison may indicate whether the inclusion (or omission) of at least one different combination of dependencies derived from the current consumer request may result in approval or denial of the current consumer request. The convolutional network may generate the function based on the comparisons, wherein the function may identify relationships between each dependency derived from the current consumer request and may indicate whether the relationships are likely to increase (or decrease) the likelihood of success of the current consumer request.

At step 313, quantum processing model 115 may analyze the function using quantum processing logic. The analysis of the function may indicate a plurality of relationships between the dependencies derived from the current consumer request and may indicate how the likelihood of success of the current consumer request may fluctuate based on different configurations of dependencies derived from the current consumer request, different corresponding values, or the like. Quantum processing model 115 may determine a likelihood of success for each of the different configurations of dependencies derived from the current consumer request and may compare the likelihoods of success to identify a maximum likelihood of success.

The different configurations of dependencies derived from the current consumer request may each correspond to a different state of the function. Quantum processor 116 may process each state of the function in parallel using at least one quantum processing gate. Quantum processor 116 may superimpose a plurality of quantum processing gates such that each quantum processing gate may analyze a different state of the function and may generate a likelihood of success of the current consumer request based on the configuration of dependencies that corresponds to the state of the function. As such, quantum processor 116 may generate a range of likelihoods of success, wherein the range may comprise a maximum likelihood of success.

At step 314, quantum analysis engine 117 may analyze the maximum likelihood of success to determine whether the maximum likelihood of success corresponds to the training dataset (e.g., to determine an accuracy of the maximum likelihood of success, an accuracy of the training dataset, an accuracy of the convolutional network, or the like). Quantum analysis engine 117 may compare the maximum likelihood of success to the training dataset to determine whether the maximum likelihood of success and the corresponding configuration of dependencies were previously identified during the analysis of the consumer request. Quantum analysis engine 117 may use at least one quantum search algorithm to parse consumer data database 118 to determine whether the training dataset comprises each dependency within the configuration of dependencies associated with the maximum likelihood of success.

If, at step 314, the at least one quantum search algorithm indicates that at least one dependency associated with the maximum likelihood of success might not correspond to the data within the training dataset, then, at step 315, quantum analysis engine 117 may determine that the maximum likelihood of success might not be accurate and may analyze the data within the training dataset and the convolutional network. Quantum analysis engine 117 may identify differences between the configuration of dependencies that corresponds to the maximum likelihood of success and the plurality of configurations within the training dataset. Quantum analysis engine 117 may transmit a notification to convolutional network engine 114, wherein the notification may indicate the identified differences and may comprise instructions to update and analyze the training dataset and the convolutional network based on the identified differences. Quantum analysis engine 117 may instruct convolutional network engine 114 to return to step 311 and to run the current consumer request through the updated convolutional network (e.g., for a pre-determined period of time, until the maximum likelihood of success corresponds to the data within the training dataset, or the like).

Alternatively, if, at step 314, the at least one quantum search algorithm indicates that the configuration of dependencies associated with the maximum likelihood of success corresponds to the data within the training dataset, then, at step 316, quantum analysis engine 117 may determine that the maximum likelihood of success may be accurate and may determine whether the maximum likelihood of success is greater than a satisfaction threshold value. The satisfaction threshold value may indicate a minimum likelihood of success that may be required for approval of the current consumer request.

If, at step 316, quantum analysis engine 117 determines that the maximum likelihood of success is equal to or greater than the satisfaction threshold value, then, at step 317, quantum analysis engine 117 may approve the current consumer request. Quantum analysis engine 117 may generate a notification indicating approval of the current consumer request and may transmit the notification to enterprise organization computing device 130 and consumer computing device 140. Quantum analysis engine 117 may also indicate, in consumer data database 118, approval of the current consumer request.

Alternatively, if, at step 316, quantum analysis engine 117 determines that the maximum likelihood of success is less than the satisfaction threshold value, then, at step 318, quantum analysis engine 117 may deny the current consumer request. Quantum analysis engine 117 may generate a notification indicating denial of the current consumer request and may transmit the notification to enterprise organization computing device 130 and consumer computing device 140. Quantum analysis engine 117 may also indicate, in consumer data database 118, denial of the current consumer request.

As a result, the proposed solution may provide the following benefits: 1) real-time, or near real-time, generation and transmission of consumer data requests, using an artificial intelligence model, based on receiving a consumer request to initiate a transaction with at least one enterprise organization service and/or program; 2) real-time, or near real-time, analysis of the consumer request and the consumer data; 3) real-time, or near real-time, training of a convolution network engine by the artificial intelligence model based on the analysis; and 4) real-time, or near real-time, generation of a function that describes dependencies and corresponding consumer data values derived from the consumer request; and 5) real-time, or near real-time, parallel analysis of different states of the function, using a quantum processing model, to determine whether to approve or deny a consumer request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
at a computing device including one or more processors and memory:
    receiving, from a consumer computing device, a request to initiate a transaction with an enterprise organization service;
    transmitting, to the consumer computing device and based on receiving the consumer request, a request for consumer data;
    receiving, from the consumer computing device, the requested consumer data;
    analyzing the consumer request to identify one or more dependencies that correspond to the consumer request;
    identifying, based on analyzing the consumer data, values that correspond to the dependencies;
    determining a likelihood of success of the transaction based on each combination of a dependency and a corresponding value;

identifying, by a machine learning engine, patterns in customer request data within a consumer data database;
    continuously altering, by the machine learning engine, a configuration of the identified one or more dependencies;
    determining, by the machine learning engine, a likelihood of success of each altered configuration of the identified one or more dependencies;
    comparing the altered configuration of the one or more dependencies and associated likelihoods of success to the likelihood of success determined based on each combination of the dependency and the corresponding value;
    identifying, based on the comparing and by the machine learning engine, patterns that influence the likelihood of success;
    pooling, by the machine learning engine, the identified patterns that influence the likelihood of success;
    updating, by the machine learning engine and based on the pooled patterns, the combinations and the determined likelihoods of success, a training dataset;
    generating, by the machine learning engine and using the updated training dataset, a convolutional network;
    determining, by an artificial intelligence model and using the convolutional network, a function that describes a relationship between the dependencies;
    analyzing, using a quantum processing model, the function to identify a configuration of dependencies that results in a maximum likelihood of success of the transaction;
    comparing the maximum likelihood of success to a satisfaction threshold value;
    based on determining the maximum likelihood of success satisfies a satisfaction threshold, approving the consumer request; and
    transmitting, to the consumer computing device, a notification indicating approval of the consumer request.

2. The method of claim 1, wherein the request for consumer data further comprises a request for at least one of:
    personal identifiable information;
    a financial history; or
    a current financial status.

3. The method of claim 1, wherein the analyzing the consumer request to identify one or more dependencies further comprises:
    parsing the consumer request using at least one natural language processing (NLP) algorithm; and
    identifying, based on the parsing, at least one of:
        a feature that increases the likelihood of success of the transaction, or
        a feature that decreases the likelihood of success of the transaction.

4. The method of claim 1, wherein the determining the likelihood of success of the transaction further comprises:
    parsing historical data, wherein the historical data comprises at least one of:
        previously analyzed consumer requests,
        consumer data that corresponds to the previously analyzed consumer requests,
        a likelihood of success that corresponds to each previously analyzed consumer request, or a determination that corresponds to each previously analyzed consumer request and indicates whether the previously analyzed consumer requests were approved;

comparing the consumer request to the historical data; and determining, based on the comparing, whether the consumer request is similar to at least one previously analyzed consumer request.

5. The method of claim 4, further comprising, based on determining the consumer request is similar to the at least one previously analyzed consumer request:

comparing the consumer data to the historical data;

based on determining the consumer data is similar to the historical data, adjusting the likelihood of success that corresponds to the at least one previously analyzed consumer request based on identifying differences between the dependencies derived from the consumer request and dependencies associated with the at least one previously analyzed consumer request; and determining the likelihood of success of the consumer request based on the adjusting.

6. The method of claim 5, further comprising, based on determining the consumer data is not similar to the historical data, determining the likelihood of success based on weighted consumer data.

7. The method of claim 4, further comprising, based on determining the consumer request is not similar to the at least one previously analyzed consumer request, determining the likelihood of success based on weighted consumer data.

8. The method of claim 1, wherein the analyzing the function further comprises determining, using at least one quantum processing gate, a range of output values from the function, wherein each output value corresponds to a different configuration of dependencies, wherein each dependency within the different configurations of dependencies corresponds to different values of the consumer data, wherein each output value indicates a likelihood of success of the transaction based on the different values of the consumer data that corresponds to the different configurations of dependencies, and wherein the range of output values comprises the maximum likelihood of success.

9. The method of claim 8, further comprising determining an accuracy of the maximum likelihood of success, wherein the determining the accuracy comprises:

comparing the different configurations of dependencies and the corresponding different values of the consumer data to the training dataset;

determining whether dependencies within the different configurations of dependencies correspond to the dependencies within the training dataset;

based on determining at least one dependency within at least one different configuration of dependencies does not correspond to the dependencies within the training dataset, determining the maximum likelihood of success is inaccurate; and based on determining that the maximum likelihood of success is inaccurate, instructing the artificial intelligence model to analyze the convolutional network and the training dataset.

10. The method of claim 9, further comprising, based on determining the dependencies within the different configurations of dependencies correspond to the dependencies within the training dataset, determining the maximum likelihood of success is accurate.

11. The method of claim 1, wherein the satisfaction threshold value indicates a minimum likelihood of success that is needed to approve the consumer request.

12. The method of claim 11, wherein the determining the maximum likelihood of success satisfies the satisfaction threshold comprises determining the maximum likelihood of success is equal to or greater than the satisfaction threshold value.

13. The method of claim 11, further comprising determining the maximum likelihood of success does not satisfy the satisfaction threshold comprises determining the maximum likelihood of success is less than the satisfaction threshold value.

14. The method of claim 13, further comprising, based on determining the maximum likelihood of success does not satisfy the satisfaction threshold, denying the consumer request.

15. The method of claim 14, further comprising, based on denying the consumer request, transmitting, to the consumer computing device, a notification indicating denial of the consumer request.

16. A computing platform comprising:

at least one processor;

a communication interface communicatively coupled to the at least one processor; and memory storing computer-readable instructions that, when executed by the at least one processor, cause the computing platform to:

receive, from a consumer computing device, a request to initiate a transaction with an enterprise organization service;

transmit, to the consumer computing device and based on receiving the consumer request, a request for consumer data;

receive, from the consumer computing device, the requested consumer data;

analyze the consumer request to identify one or more dependencies that correspond to the consumer request;

identify, based on analyzing the consumer data, values that correspond to the dependencies;

determine a likelihood of success of the transaction based on each combination of a dependency and a corresponding value;

identify, by a machine learning engine, patterns in customer request data within a consumer data database;

continuously alter, by the machine learning engine, a configuration of the identified one or more dependencies;

determine, by the machine learning engine, a likelihood of success of each altered configuration of the identified one or more dependencies;

compare the altered configuration of the one or more dependencies and associated likelihoods of success to the likelihood of success determined based on each combination of the dependency and the corresponding value;

identify, based on the comparing and by the machine learning engine, patterns that influence the likelihood of success;

pool, by the machine learning engine, the identified patterns that influence the likelihood of success;

update, by the machine learning engine and based on the pooled patterns, the combinations and the determined likelihoods of success, a training dataset;

generate, by the machine learning engine and using the updated training dataset, a convolutional network;

determine, by an artificial intelligence model and using the convolutional network, a function that describes a relationship between the dependencies;

analyze, using a quantum processing model, the function to identify a configuration of dependencies that results in a maximum likelihood of success of the transaction;

compare the maximum likelihood of success to a satisfaction threshold value;

based on determining the maximum likelihood of success satisfies a satisfaction threshold, approve the consumer request; and transmit, to the consumer computing device, a notification indicating approval of the consumer request.

17. The computing platform of claim 16, wherein the analyzing the consumer request to identify one or more dependencies further causes the computing platform to:

parse the consumer request using at least one natural language processing (NLP) algorithm; and identifying, based on the parsing, at least one of:

a feature that increases the likelihood of success of the transaction, or a feature that decreases the likelihood of success of the transaction.

18. The computing platform of claim 16, wherein the determining the likelihood of success of the transaction further causes the computing platform to:

parse historical data, wherein the historical data comprises at least one of:

previously analyzed consumer requests, consumer data that corresponds to the previously analyzed consumer requests, a likelihood of success that corresponds to each previously analyzed consumer request, or a determination that corresponds to each previously analyzed consumer request and indicates whether the previously analyzed consumer requests were approved;

compare the consumer request to the historical data; and determine, based on the comparing, whether the consumer request is similar to at least one previously analyzed consumer request.

19. One or more non-transitory computer-readable media storing instructions that, when executed by a computing platform comprising at least one processor, memory, and a communication interface, cause the computing platform to:

receive, from a consumer computing device, a request to initiate a transaction with an enterprise organization service;

transmit, to the consumer computing device and based on receiving the consumer request, a request for consumer data;

receive, from the consumer computing device, the requested consumer data;

analyze the consumer request to identify one or more dependencies that correspond to the consumer request;

identify, based on analyzing the consumer data, values that correspond to the dependencies;

determine a likelihood of success of the transaction based on each combination of a dependency and a corresponding value;

identify, by a machine learning engine, patterns in customer request data within a consumer data database;

continuously alter, by the machine learning engine, a configuration of the identified one or more dependencies;

determine, by the machine learning engine, a likelihood of success of each altered configuration of the identified one or more dependencies;

compare the altered configuration of the one or more dependencies and associated likelihoods of success to the likelihood of success determined based on each combination of the dependency and the corresponding value;

identify, based on the comparing and by the machine learning engine, patterns that influence the likelihood of success;

pool, by the machine learning engine, the identified patterns that influence the likelihood of success;

update, by the machine learning engine and based on the pooled patterns, the combinations, and the determined likelihoods of success, a training dataset;

generate, by the machine learning engine and using the updated training dataset, a convolutional network;

determine, by an artificial intelligence model and using the convolutional network, a function that describes a relationship between the dependencies;

analyze, using a quantum processing model, the function to identify a configuration of dependencies that results in a maximum likelihood of success of the transaction;

compare the maximum likelihood of success to a satisfaction threshold value;

based on determining the maximum likelihood of success satisfies a satisfaction threshold, approve the consumer request; and transmit, to the consumer computing device, a notification indicating approval of the consumer request.

20. The non-transitory computer-readable media of claim 19, wherein the satisfaction threshold value indicates a minimum likelihood of success that is needed to approve the consumer request.

* * * * *